United States Patent
Bylander (10) Patent No.: US 8,444,326 B2
(45) Date of Patent: May 21, 2013

(54) FLEXIBLE OPTICAL COUPLING

(75) Inventor: James R. Bylander, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 139 days.

(21) Appl. No.: 12/990,796

(22) PCT Filed: May 15, 2009

(86) PCT No.: PCT/US2009/044065
§ 371 (c)(1),
(2), (4) Date: Nov. 3, 2010

(87) PCT Pub. No.: WO2009/148795
PCT Pub. Date: Dec. 10, 2009

(65) Prior Publication Data
US 2011/0058772 A1    Mar. 10, 2011

Related U.S. Application Data

(60) Provisional application No. 61/057,447, filed on May 30, 2008.

(51) Int. Cl.
*G02B 6/38* (2006.01)
*H04B 10/00* (2006.01)

(52) U.S. Cl.
USPC ............... 385/60; 385/53; 385/72; 385/78; 385/85; 385/137; 398/164

(58) Field of Classification Search
USPC ............ 385/53, 60, 72, 78, 85, 137; 398/164
See application file for complete search history.

(56) References Cited

U.S. PATENT DOCUMENTS

| | | | |
|---|---|---|---|
| 4,124,272 A | | 11/1978 | Henderson et al. |
| 4,291,943 A | * | 9/1981 | Binek et al. ................. 385/56 |
| 4,982,083 A | | 1/1991 | Graham et al. |
| 5,052,775 A | * | 10/1991 | Bossard et al. ............. 385/76 |
| 5,071,211 A | * | 12/1991 | Debortoli et al. ........... 385/76 |
| 5,082,344 A | | 1/1992 | Mulholland et al. |
| 5,218,657 A | | 6/1993 | Tokudome et al. |
| 5,408,551 A | | 4/1995 | Maria van Woesik |
| 5,475,781 A | * | 12/1995 | Chang et al. ............... 385/76 |

(Continued)

FOREIGN PATENT DOCUMENTS

| CA | 2 190 405 C | 10/2003 |
|---|---|---|
| WO | 2006/019515 | 2/2006 |

OTHER PUBLICATIONS

Product Literature: "SC Adapter Series", Senko Advanced Components, [retrieved from the internet on May 7, 2008]; URL <http://www.senko.com/fiberoptic>.

*Primary Examiner* — Brian Healy
*Assistant Examiner* — Guy Anderson
(74) *Attorney, Agent, or Firm* — Gregg H. Rosenblatt (57) ABSTRACT

An optical fiber coupling device, comprises a coupling assembly that includes a first ferrule and a second ferrule and an optical fiber having a first end mounted in the first ferrule and a second end mounted in the second ferrule. The first ferrule is disposed in an axial bore of a first barrel and the second ferrule is disposed in an axial bore of a second barrel. The coupling assembly is disposable in a coupling housing configured to receive at least two optical fiber connectors.

13 Claims, 9 Drawing Sheets

U.S. PATENT DOCUMENTS

| | | |
|---|---|---|
| 5,710,851 A | 1/1998 | Walter et al. |
| 6,390,690 B1 | 5/2002 | Meis et al. |
| 6,712,523 B2 | 3/2004 | Zimmel |
| 6,789,953 B1 | 9/2004 | deJong et al. |
| 7,360,955 B2 * | 4/2008 | Suzuki et al. .................. 385/92 |
| 2003/0063862 A1 * | 4/2003 | Fillion et al. .................... 385/53 |
| 2005/0141817 A1 * | 6/2005 | Yazaki et al. ................... 385/78 |
| 2008/0013910 A1 * | 1/2008 | Reagan et al. ................ 385/135 |
| 2008/0118207 A1 * | 5/2008 | Yamamoto et al. ............ 385/88 |
| 2008/0131057 A1 | 6/2008 | McGranahan |

* cited by examiner

FLEXIBLE OPTICAL COUPLING

CROSS REFERENCE TO RELATED APPLICATIONS

This application is a national stage filing under 35 U.S.C. 371 of PCT/US2009/044065, filed May 15, 2009, which claims priority to U.S. Provisional Application No. 61/057447, filed May 30, 2008, the disclosure of which is incorporated by reference in its/their entirety herein.

BACKGROUND

1. Field of the Invention

The present invention is directed to a flexible optical fiber coupling for a variety of coupling housings.

2. Related Art

Mechanical optical fiber connectors for the telecommunications industry are known. For example, LC, ST, FC, and SC optical connectors are widely used in premise and central office telecommunications applications.

Many optical fiber connector systems are designed as two plugs and a coupling in between. In a typical single contact configuration such as the SC connector, each plug has a cylindrical ferrule which precisely locates the end of a fiber. Conventionally, two SC plugs are mated in a coupling which includes an alignment sleeve and latching features. When the plugs are inserted into the coupling, the alignment sleeve aligns the ferrules, holding the fibers in a precisely axially aligned orientation such that optical signals move efficiently from the fiber of the first SC connector to the fiber of the second SC connector. For example, see U.S. Pat. No. 4,124,272.

Figure 1:
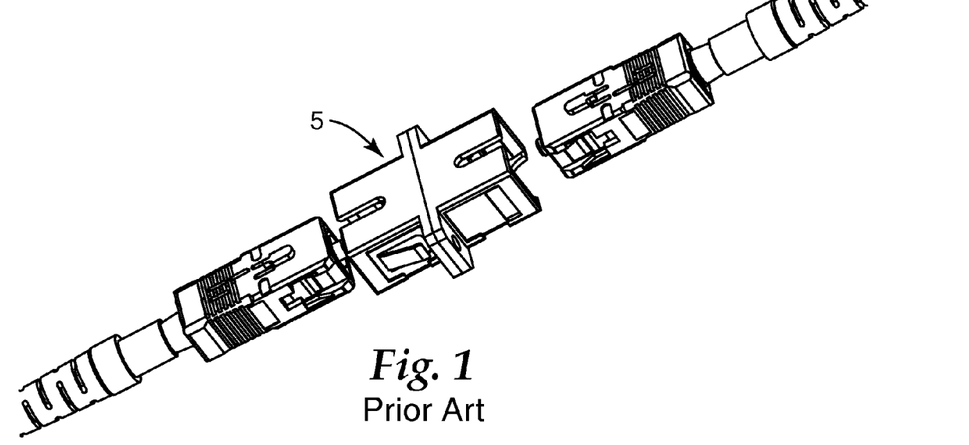
FIG. 1 is an isometric view of a conventional coupling.

Conventional couplings are configured as in-line couplings (see e.g., coupling 5 of FIG. 1). Also, jumper cables are made with a plug on each end. In some cases the two ends of a jumper cable may both be plugged into couplings in the same housing such as a patch panel. Some of these assemblies are made in a loopback configuration for use in testing optical systems with duplex couplings. In addition, fan out assemblies exist which have a multiple fiber plug on one end of a group of fibers and a number of discrete connectors on the other fiber ends. Some of these make use of sockets on the discrete fiber ends.

In existing buildings, such as homes, apartment buildings and office buildings, the space available to install new fiber interface devices is limited. For many restricted-space applications, such as with wall boxes and outlets, the length of connections made with conventional in-line couplings is too great. Also, conventional jumper cables are not of appropriate size. As a result, non in-line connectors, such as those with right-angle bends, have been developed (for example, see WO 2006/019515 A1). However, this right angle connector solution may not be compatible with all types of wall boxes and outlets.

SUMMARY

According to a first aspect of the present invention, an optical fiber coupling device comprises a coupling assembly that includes a first ferrule and a second ferrule and an optical fiber having a first end mounted in the first ferrule and a second end mounted in the second ferrule. The first ferrule is disposed in an axial bore of a first barrel and the second ferrule is disposed in an axial bore of a second barrel. The coupling assembly is disposable in a coupling housing configured to receive at least two optical fiber connectors.

In another aspect, the first and second barrels have a cylindrical shape. In a further aspect, the first and second ferrules each have a length of from about 4 mm to about 7 mm and the optical fiber has a length of from about 20 mm to about 200 mm, and the fiber has a minimum bend radius of from less than about 15 mm.

In another aspect, the coupling housing comprises a barrel housing and a connector housing, where the first and second barrels are mounted in the barrel housing and wherein the connector housing includes first and second ports to respectively receive a first optical fiber connector and a second optical fiber connector. In a further aspect, the device comprises first and second ferrule alignment guides, where a first ferrule alignment guide is disposed within the barrel housing and provides passage for the first ferrule of the coupling assembly to contact a ferrule of the first optical fiber connector. The second ferrule alignment guide is disposed within the barrel housing and provides passage for the second ferrule of the coupling assembly to contact a ferrule of the second optical fiber connector.

In another aspect, the coupling housing is configured to provide a 180 degree coupling. In a further aspect, the coupling housing is configured to provide a 90 degree coupling.

In another aspect, the coupling housing comprises a first barrel housing to house the first barrel, a second barrel housing to house the second barrel, a first connector housing including a first connector port to receive a first optical fiber connector, and a second connector housing including a second connector port to receive a second optical fiber connector. In a further aspect, the first barrel and connector housings are connected to the second barrel and connector housings via an adjustable coupling mechanism. In yet another aspect, the coupling housing is configured to provide an adjustable coupling.

In another aspect, the coupling device is configured to receive at least two optical fiber connectors each having a connector format of one of an SC, LC, ST, and FC format.

In another aspect, a wall-plate assembly comprises the optical fiber coupling device described above, a plate, and a mounting structure to mount the coupling device to a first side of the plate, wherein at least one of the connector ports is disposed on a second side of the plate.

According to another aspect of the invention, a multi-port coupling device comprises a first coupling assembly that includes a first ferrule and a second ferrule and an optical fiber having a first end mounted in the first ferrule and a second end mounted in the second ferrule. The first coupling assembly is disposed in a first coupling housing configured to receive and couple at least two optical fiber connectors. The multi-port coupling device further comprises a second coupling assembly disposed in a second coupling housing configured to receive and couple at least two additional optical fiber connectors. The multi-port coupling device further comprises a support structure to mount the first and second coupling assemblies therein adjacent to one another, where the first and second coupling housings are each mounted to the support structure via an adjustable coupling mechanism.

In another aspect, the support structure is mounted in a cutout section of a panel, where each coupling includes first and second connector ports, where a first connector port of the first coupling is disposed on one side of the panel and where the second connector port is disposed on the opposite side of the panel.

The above summary of the present invention is not intended to describe each illustrated embodiment or every

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to a flexible optical fiber coupling. In particular, the flexible optical fiber coupling of the exemplary embodiments can be readily installed and utilized for Fiber To The Home (FTTH) and/or Fiber To The X (FTTX) network installations. The exemplary flexible optical fiber coupling can be utilized in restricted-space installation environments, where space requirements are critical.

Figure 2A:
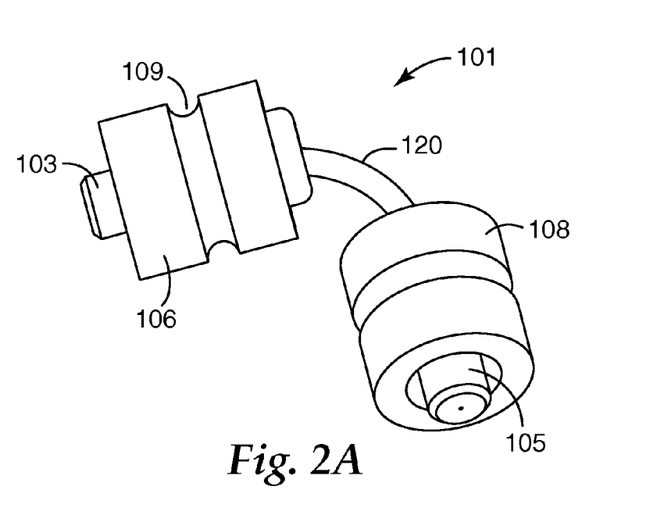
FIG. 2A is an isometric view of an exemplary coupling assembly according to an aspect of the invention.
Figure 2B:
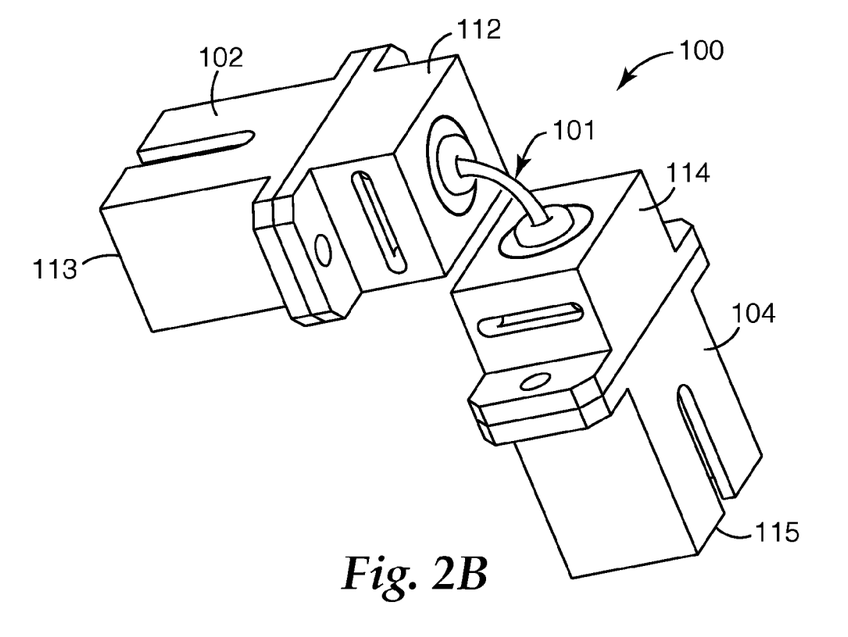
FIG. 2B is an isometric view of an exemplary coupling that includes the coupling assembly of FIG. 2A according to an aspect of the invention.

FIGS. 2A and 2B show a first exemplary aspect of the present invention, an optical fiber coupling 100 that includes an optical coupling assembly 101. The coupling 100 is "flexible," in that it can be configured to couple two optical fiber connectors at virtually any angle of entrance and exit (e.g., as a 90 degree coupling (see e.g., FIG. 4A), a 180 degree coupling (see e.g., FIG. 3A), an in-line (straight) coupling, or any other angle).

Coupling 100 comprises a coupling assembly 101 that includes two ferrules 103, 105 linked by an optical fiber 120. The ferrules are housed and secured in respective barrels (which can also be referred to as collars) 106 and 108, each of which include an axial bore to receive the ferrules. In a preferred aspect, barrels 106, 108 have a cylindrical shape, making them less orientation sensitive and a simple fit into a housing or multiple housings. In one aspect, ferrules 103, 105 are secured in barrels 106, 108 via an adhesive, such as an epoxy.

In an exemplary aspect, barrel 106 is secured in housing 112 and barrel 108 is secured in housing 114. These barrel housings are each coupled to a respective connector housing 102, 104. In an alternative aspect, the barrel housing and connector housing can be formed as a single integral part.

Figure 2C:
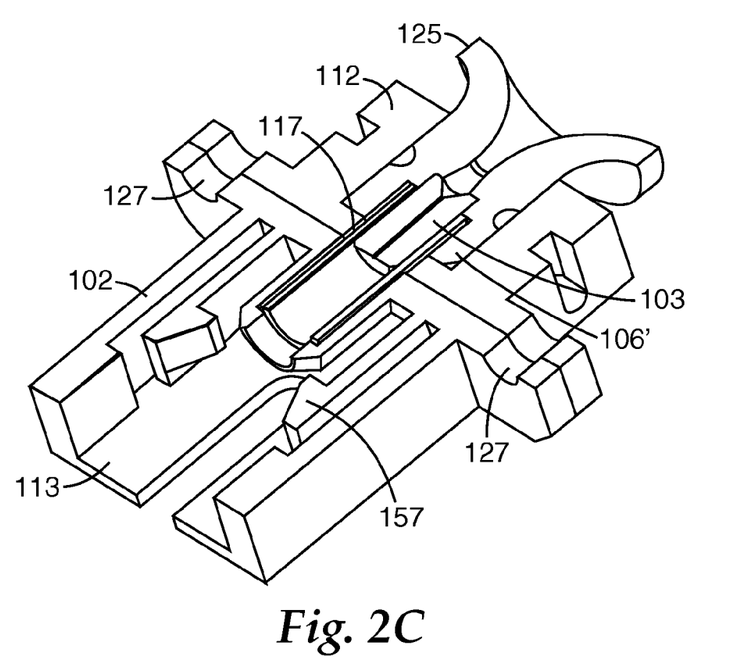
FIG. 2C is a sectional view of the exemplary connector housing and barrel housing of the coupling of FIG. 2B according to an aspect of the invention.

Connector housings 102, 104 each include a respective connector port 113, 115, configured to receive an optical fiber connector and align the connector ferrule (e.g., see FIG. 5B) to the respective coupling ferrule 103, 105. Each connector port can provide a smooth, snug fit for the incoming connector. In addition, each connector housing can also include a catch mechanism, such as catch 157 shown in FIG. 2C, to secure a portion of the incoming connector.

Each connector housing of assembly 100 further includes a ferrule alignment guide 117. As seen in the cross section view of FIG. 2C, the ferrule 103 is received in an alignment guide 117, which also receives the ferrule of the connector being coupled (not shown). In one aspect, the ferrule alignment guide 117 is a split ceramic sleeve retained in a bore formed in both connector and barrel housings that provides for smooth passage of the ferrule.

Ferrules 103, 105 can be formed from a ceramic, glass, plastic, or metal material to support the optical fiber 120 inserted and secured therein. In a preferred aspect, ferrules 103, 105 are each ceramic ferrules. In a further preferred aspect, the ferrule lengths are shorter than standard ferrule lengths. In a more preferred aspect, the ferrules 103, 105 are at least 50% shorter than conventional ferrules to help maintain the compactness of the coupling, e.g., about 5 mm long, as compared to a standard ferrule length of about 10.5 mm. Similarly, the ferrule alignment guide 117 can also be of shorter length to efficiently accommodate the shortened ferrule lengths.

A first end of optical fiber 120 is inserted through the ferrule 103, such that the first fiber end slightly protrudes from or is coincident or coplanar with the end face of ferrule 103. Similarly, a second end of optical fiber 120 is inserted through the ferrule 105, such that the second fiber end slightly protrudes from or is coincident or coplanar with the end face of ferrule 105. The fiber 120 is secured in each ferrule using a conventional adhesive, such as an epoxy. Preferably, the first and second fiber ends are polished in the factory (e.g., a flat or angle-polish, with or without bevels).

The fiber 120 can comprise a low bend radius fiber, such as a CLEARCURVE™ fiber, available from Corning Inc. (Corning, N.Y.). Other alternative fibers can include the ALL-WAVE™ Flex ZWP fiber, available from OFS (Norcross, Ga.) and the BENDBRIGHT™ and BENDBRIGHT$^{XS}$ fibers, available from Draka Comtec America (North Dighton, Mass.). These fibers can have very small minimum bend radii (of from about 5 mm to about 10 mm, without substantial signal loss at conventional communications wavelengths). Thus, only a short overall length of fiber (e.g., from about 20 mm to about 30 mm) is needed for the coupling 100. As would be apparent to one of ordinary skill in the art given the present description, the actual length of fiber may be significantly increased and would typically vary depending on the size and the configuration of the housing in which the coupling assembly is mounted. For example, the length of fiber 120 can be increased to a length of about 120 mm-150 mm so that the coupling ports 103 and 105 can be positioned to span the thickness of a standard wall or divider.

The barrels 106, 108 can be formed or molded from a polymer material, although metal and other suitably rigid materials can also be utilized. In addition, each of the barrels 106, 108 can include a groove 109 formed on an outer surface thereof. In operation, a fastener, staple or clip to can be used to engage the groove 109 to secure the barrel in its respective housing. Alternatively, an adhesive, such as an epoxy, can be used to secure the barrel in its respective housing.

In FIG. 2B, each of connector housings 102 and 104 includes an opening or port 113, 115 that is configured to receive a standard optical connector. In the exemplary aspects shown herein, the coupling 100 is configured to couple two SC format connectors (see e.g., FIGS. 5A-5B). However, as would be apparent to one of ordinary skill in the art given the present description, the coupling 100, and components thereof, can be modified to receive optical connectors having other standard formats, such as ST, FC, and LC connector formats. In a further alternative aspect, the couplings described herein can be configured to accept two different connector formats. For example, the first connector housing of the coupling can be configured to receive an ST connector, while the second connector housing of the coupling can be configured to receive an SC connector. Other combinations of connector formats can be utilized, as would be apparent to one of skill in the art given the present description.

In addition, the barrel housing 112 can be coupled to the connector housing 102 via a set of pins, screws or other conventional fasteners (not shown). In one aspect, an adhesive, such as an epoxy, or the like can fasten the barrel housing 112 to the connector housing 102. Alternatively, the barrel housing 112 can be coupled to the connector housing 102 via ultrasonic welding, or through the use of conventional fasteners at screw holes 127.

Figure 2D:
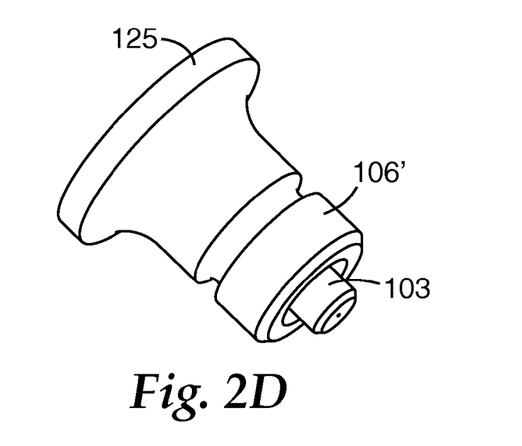
FIG. 2D is an isometric view of an exemplary barrel with a funnel-shaped entrance.
Figure 2E:
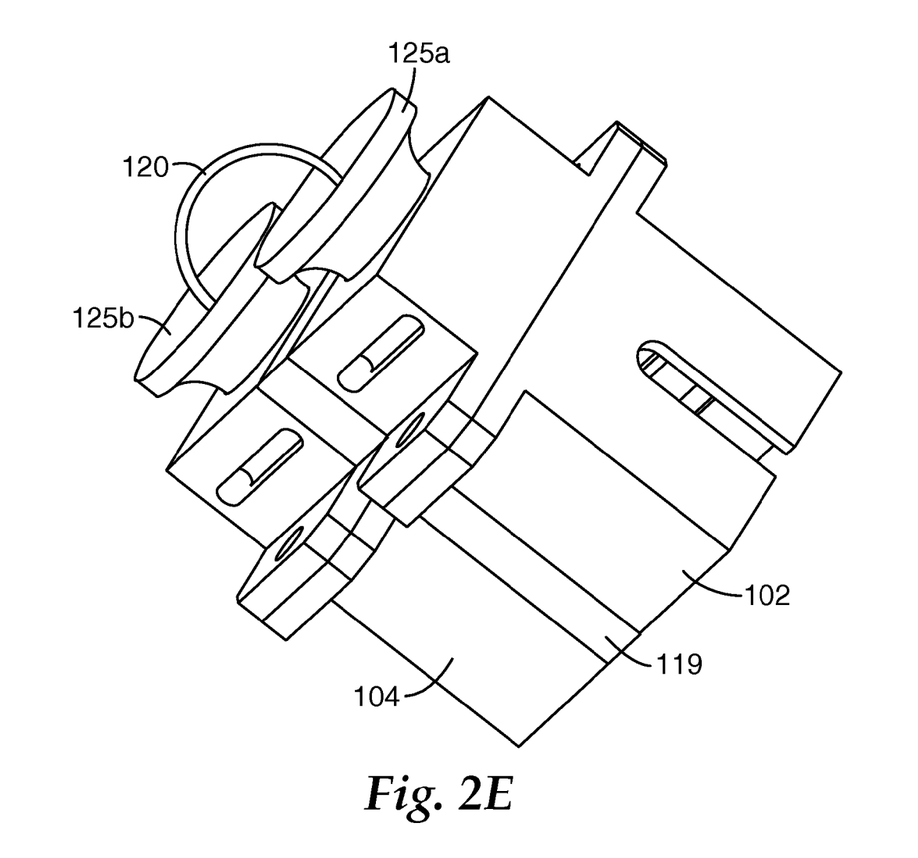
FIG. 2E is an isometric view of an exemplary 180 degree coupling.

Optionally, as shown in FIG. 2D, the coupling 100 can further include one or more funnel-shaped entrances or boots 125 axially aligned and attached to the barrel, where the funnel-shaped entrance or boot 125 can be utilized to protect the small bend radius fiber 120 from bend related stress losses. In particular, funnel-shaped entrances or boots 125 (or 125a and 125b as shown in FIG. 2E) can prevent over-bending of fiber 120. In one exemplary aspect, funnel-shaped entrance or boot 125 is integrally formed (e.g., as a single piece) with barrel 106'. Alternatively, funnel-shaped entrance or boot 125 is formed as a separate piece that is attached to barrel 106' by, e.g., an adhesive, such as an epoxy. In a further alternative aspect, funnel-shaped entrance or boot 125 is formed from a material that is different (e.g., more flexible) from the material used to form barrel 106'.

With this configuration, the flexible coupling assembly 101 can be disposed in housings configured as a 180 degree coupling, as is shown in FIG. 2E. By utilizing the exemplary configuration of FIG. 2E, a 180 degree coupling can have a length as small as 25 mm, and the length of a mated pair of connectors can be reduced by about 30%.

In this configuration, the housings 102/112 and 104/114 can be secured to each other via an adhesive, such as an epoxy, tape, or mechanical fastener 119. Alternatively, as described below, a pin and socket fastener can connect the housings 102/112 and 104/114 to each other, so that an adjustable (e.g., rotatable) coupling angle can be provided. In a further alternative, coupling assembly 101 can be disposed in a multi-port housing or wall box configured to provide a plurality of couplings for a plurality of optical fiber connectors.

The exemplary embodiments herein can be utilized in both conventional enclosure applications—such as for couplings in patch panels, fiber closures, electronics housings or wall outlets—as well as in more restricted space applications, where it is advantageous to have the coupled connectors that are not axially aligned. Using a very short piece of the tight bend fiber to redirect the light in a coupling instead of using a much longer length in the cable, provides the potential for lower system costs as a wide variety of traditional fibers may then be used in the cable. In this aspect, the couplings described herein allow for coupled connectors that are oriented off axis and off-plane from each other. These off-axis and off-plane couplings can reduce the depth requirements for the enclosures. For example, in one wall outlet application, it may be desirable that a plug inside the wall be inserted into a coupling with its axis parallel to the plane of the wall while the mating plug, which plugs into the outlet, is oriented with its axis perpendicular to the wall.

Figure 3A:
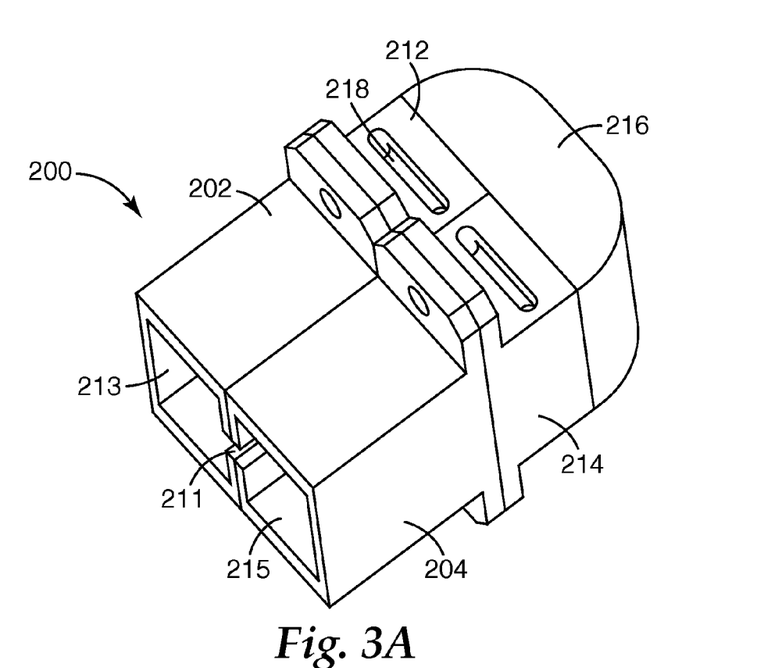
FIGS. 3A and 3B show isometric and sectional views, respectively, of an exemplary 180 degree coupling according to an aspect of the invention.
Figure 3B:
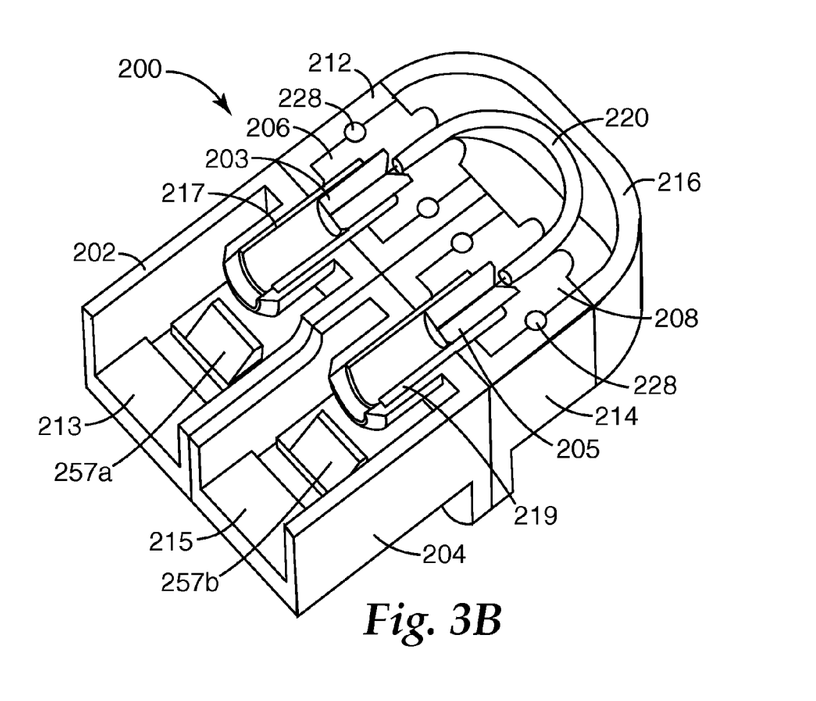

According to another exemplary embodiment of the present invention, a 180 degree coupling 200 is provided, such as is shown in FIGS. 3A and 3B. Coupling 200 includes two ferrules 203, 205 linked by an optical fiber 220. The ferrules are housed and secured in respective barrels 206 and 208, each of which include an axial bore to receive the ferrules. In a preferred aspect, barrels 206, 208 have a cylindrical shape and are housed in barrel housings 212 and 214. Each barrel housing 212, 214 is secured to a connector housing 202, 204. Also, a fiber protection housing 216 can be utilized as a cover for the bent fiber 220. Connector housings 202, 204 include connector ports 213, 215, respectively, that are configured to receive conventional optical fiber connectors. In an alternative aspect, the barrel and connector housings can be formed as a single integral housing element.

Ferrules 203, 205 can be formed from a ceramic, glass, plastic, or metal material, such as described above, and can secure the ends of optical fiber 220 therein. The fiber 220 is secured in each ferrule using a conventional adhesive, such as an epoxy. Preferably, the first and second fiber ends are polished in the factory. Similar to the above description, the fiber 220 can comprise a low bend radius fiber. The barrels 206, 208 can be formed or molded from a polymer material, although metal and other suitably rigid materials can also be utilized. In addition, each of the barrels 206, 208 can include a groove formed on an outer surface thereof. For example, when barrel 206 is fully inserted in housing 212 the groove match up with grooves 228 formed in portions of the housing 212. In operation, a fastener, staple or clip to can be inserted in an outer notch 218 (see FIG. 3B) formed on the outer surface of housing 212, wherein the staple engages the barrel grooves to secure the barrel in place. Housing 216 can cover the fiber 220 to protect it from interactions with outside elements.

In FIG. 3B, the connector housings 202, 204 include openings or ports 213 and 215 that are each configured to receive a standard optical connector and align the connector ferrule (e.g., see FIG. 5B) to the respective coupling ferrule 203, 205. In addition, each connector housing can also include a catch mechanism, such as catch 257a, 257b, to secure a portion of the incoming optical fiber connector. Also, the connector housings include ferrule guides 217 and 219. Each ferrule guide is configured to receive the ferrule of the connector being coupled (not shown) and guide the connector ferrule to the appropriate coupling ferrule. The ferrule guides can be affixed in bores formed the connector and barrel housings as shown. In addition, the barrel housing 212 can be coupled to the connector housing 202 via a set of pins, screws or other conventional fasteners (not shown). Alternatively, the barrel housings 212, 214 can be coupled to the connector housings 202, 204 via an adhesive, such as an epoxy, or the like. In a further alternative, the barrel housings 212, 214 can be coupled to the connector housings 202, 204 via ultrasonic welding.

For the above 180 degree coupling, this type of device can be used to make a very "thin" patch panel, in which all connections would be made on the same side of the panel. In another configuration, if the back end of such a coupling housing 212, 214 is sealed and the coupling 200 is mounted with the connector ports 213, 215 oriented at a lower position, then this configuration can provide a functional "bell jar" to keep water away from the optical contact. This additional protection against water can be advantageous in those cases where an outer closure leaks. Further, the 180 degree coupling 200 can also be used to reduce the size and/or simplify the fiber routing in a butt-type closure.

Figure 4A:
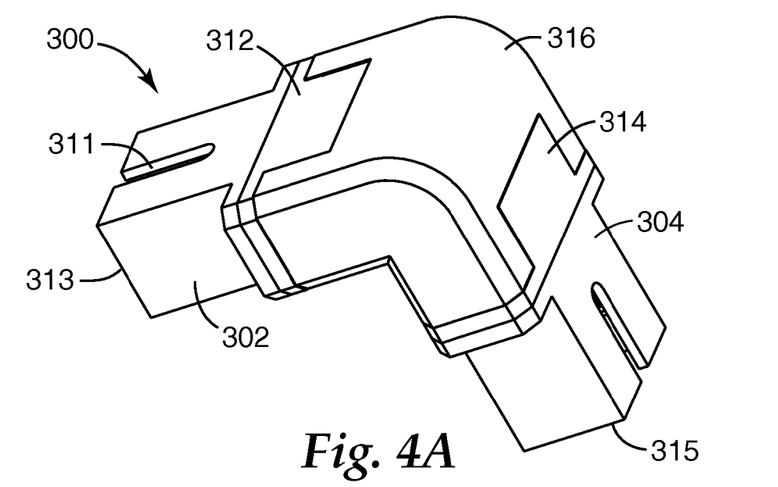
FIGS. 4A and 4B show isometric and schematic cross-section views, respectively, of an exemplary 90 degree coupling according to an aspect of the invention.
Figure 4B:
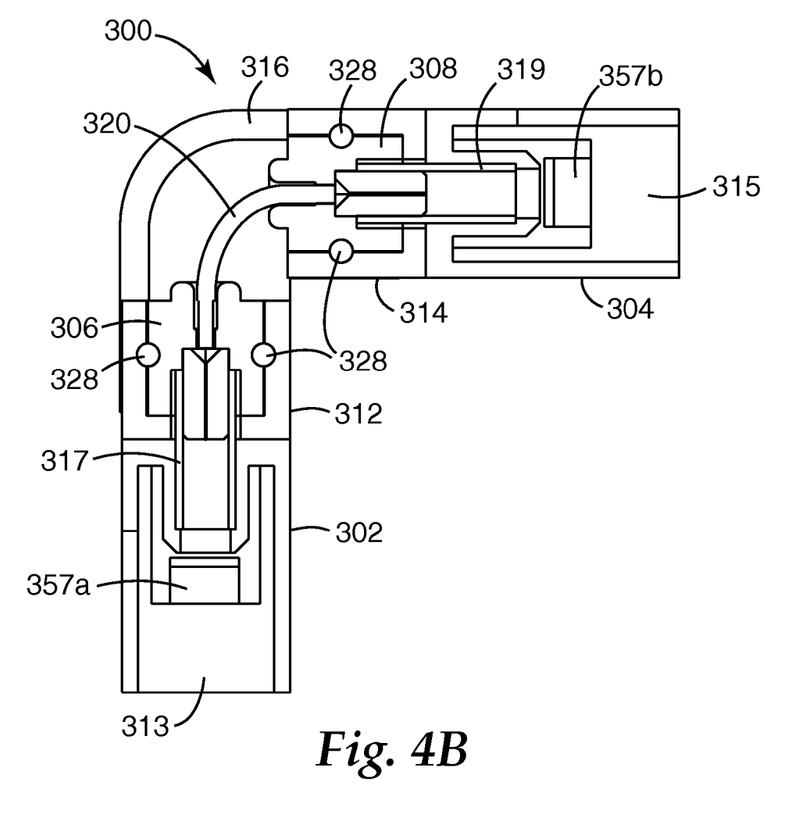

According to yet another exemplary embodiment of the present invention, the flexible coupling described above can be configured as a 90 degree or right angle coupling. For example, a 90 degree coupling 300 is shown in FIGS. 4A and 4B. Coupling 300 includes two ferrules 303, 305 linked by an optical fiber 320. The ferrules are housed and secured in respective barrels 306 and 308, each of which include an axial bore to receive the ferrules. In a preferred aspect, barrels 306, 308 have a cylindrical shape and are housed in barrel housings 312, 314. The barrel housings 312, 314 are secured to connector housings 302 and 304. In addition, barrel housings 312, 314 are also secured to housing 316 which protects the bent fiber 320 and has a fixed orientation, here, 90 degree bend. Of course, as would be apparent to one of skill in the art given the present description, the bend angle could also be a different angle, such as 60 degrees or 120 degrees, depending on the application. The size of the coupling can be kept towards a minimum with the use of small bend radius fiber, such as that described above.

Connector housing 302 includes connector port 313 and connector housing 304 includes connector port 315, that are each configured to receive a conventional optical fiber connector. Optionally, connector housings 302 and 304 can each further include a slot 311 configured to provide passage of an orientation feature, such as a latch or other protrusion, formed on a particular connector shell. In addition, each connector housing can include a catch mechanism, such as 357a, 357b, to secure a portion of the incoming optical fiber connector.

Ferrules 303, 305 can be formed from a ceramic, glass, plastic, or metal material, such as described above. Ferrules 303, 305 secure the ends of optical fiber 320 therein. The fiber 320 is secured in each ferrule using a conventional adhesive, such as an epoxy. Preferably, the first and second fiber ends are polished in the factory. Similar to the above description, the fiber 320 can comprise a low bend radius fiber. The barrels 306, 308 can be formed or molded from a polymer material, although metal and other suitably rigid materials can also be utilized. In addition, each of the barrels 306, 308 can include a groove formed on an outer surface thereof. For example, when barrel 306, 308 is fully inserted in housing 312, 314, the grooves match up with grooves 328 formed in portions of housings 312, 314.

In operation, a fastener, staple or clip to can be inserted in an outer notch or receptacle formed on the outer surface of housings 312, 314 wherein the staple/fastener engages the barrel grooves to secure the barrel in place. The housing 316 covers the fiber 320 to protect it from interactions with outside elements.

In FIG. 4B, the connector housings 302 and 304 each include openings or ports 313 and 315 that are each configured to receive a standard optical connector. Also, the connector housings include ferrule guides 317 and 319. Each ferrule guide is configured to receive the ferrule of the connector being coupled (not shown) and guide the connector ferrule to the appropriate coupling ferrule. The ferrule guides can be retained in bores formed the connector and barrel housings as shown. In addition, the barrel housings 312, 314 can be coupled to the connector housings 302 and 304 via a set of pins, screws or other conventional fasteners (not shown).

Alternatively, the barrel housings 312, 314 can be coupled to the connector housings 302, 304 (and cover 316) via an adhesive, such as an epoxy, or the like. In a further alternative, the barrel housings 312, 314 can be coupled to the connector housings 302, 304 via ultrasonic welding. In a further alternative aspect, the barrel and connector housings (and cover 316) can be formed as a single integral housing element.

Figure 5A:
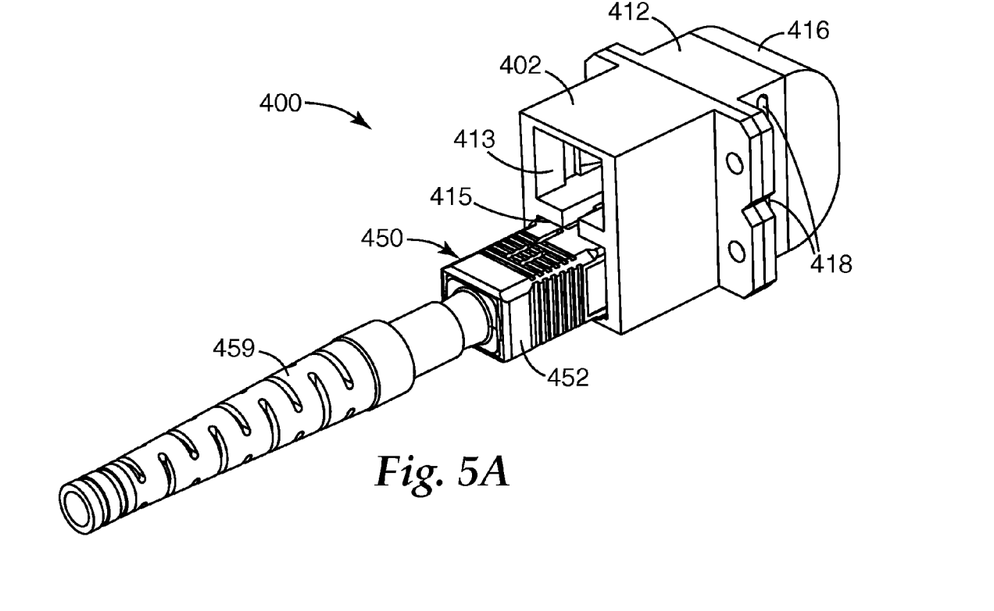
FIGS. 5A and 5B show isometric and schematic cross-section views, respectively, of an exemplary 180 degree coupling having an optical connector mounted therein according to an aspect of the invention.
Figure 5B:
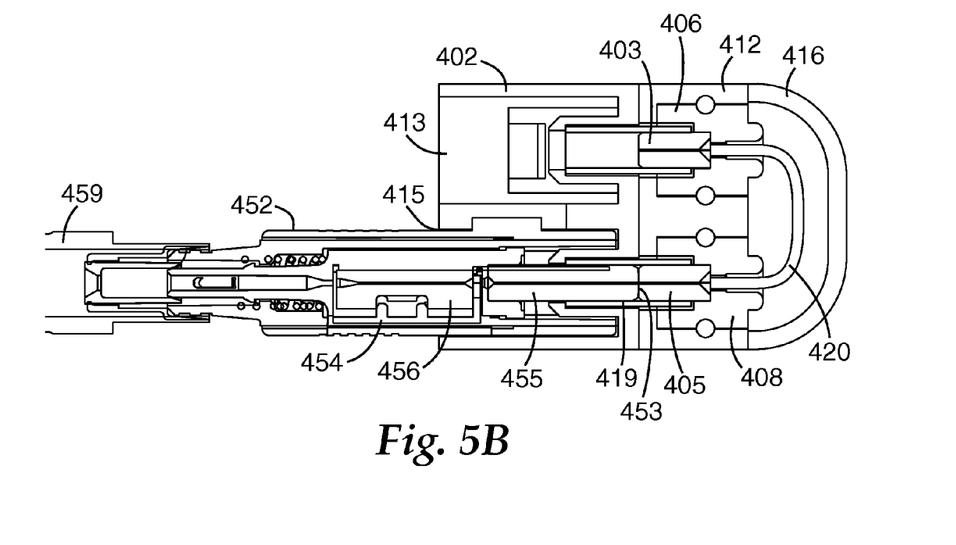

According to another exemplary embodiment, a 180 degree coupling 400 is shown in FIGS. 5A and 5B coupled to an optical connector 450. Coupling 400 is similar to coupling 200 and includes two ferrules 403, 405 linked by an optical fiber 420. The ferrules are housed and secured in respective barrels 406 and 408, each of which include an axial bore to receive the ferrules. Barrels 406 and 408 are mounted in a single piece barrel housing 412. A cover 416 can also be utilized to protect coupling fiber 420 from interactions with outside elements. Connector housing 402 is formed as a single piece and includes connector ports 413 and 415. As is shown, each of these ports is configured to receive a conventional SC format optical fiber connector (only one connector 450 is shown for simplicity). As is also shown in FIG. 5A, barrel housing 412 also includes outer notches 418 formed on the outer surface of housing 412, wherein a staple or other fastener can be used to engage barrel grooves to secure the barrels in place.

The SC-type optical connector 450 is similar to the connectors described in U.S. Pat. No. 7,369,738. While this type of optical connector is a field mountable connector, as would be understood by one of skill in the art given the present description, the couplings described herein can also receive and couple conventional factory polished/prepared optical connectors (of SC, ST, FC, LC and other standard connector formats).

Briefly, SC-type optical fiber connector 450 can include a connector body having an outer shell 452 and a fiber boot 459. The connector 450 further includes a backbone that is housed inside the shell and provides structural support for the connector. Connector 450 further includes a collar body 454 that is disposed within the connector housing and retained therein.

The collar body can house a fiber stub assembly, a mechanical splice 456, to splice a field fiber to a fiber stub, and a fiber buffer clamp.

The collar body includes a first end portion having an opening to receive and house a fiber stub assembly, which includes a ferrule 455 having an optical fiber secured therein. Ferrule 455 can be formed from a ceramic, glass, plastic, or metal material to support the optical fiber inserted and secured therein.

In a preferred aspect, when connector 450 is connected to coupling 400, the ferrule 455 is inserted in alignment guide 419 and guided to ferrule 405, where the end faces of ferrules 405 and 455 can come in contact with each other. Thus, the optical fibers can be butt-coupled to one another at interface 453. As is apparent from FIGS. 5A and 5B, the optical signal carried through connector 450 can be transmitted to another connector disposed in port 413 via coupling fiber 420.

Figure 6A:
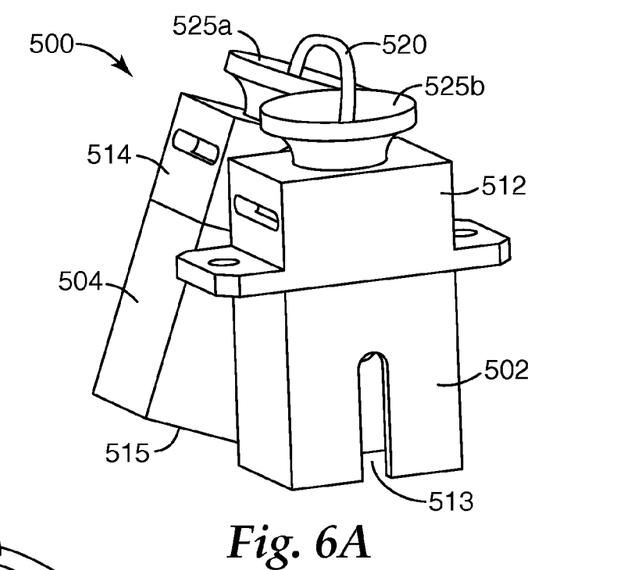
FIG. 6A shows an isometric view of an adjustable coupling according to another aspect of the invention.
Figure 6B:
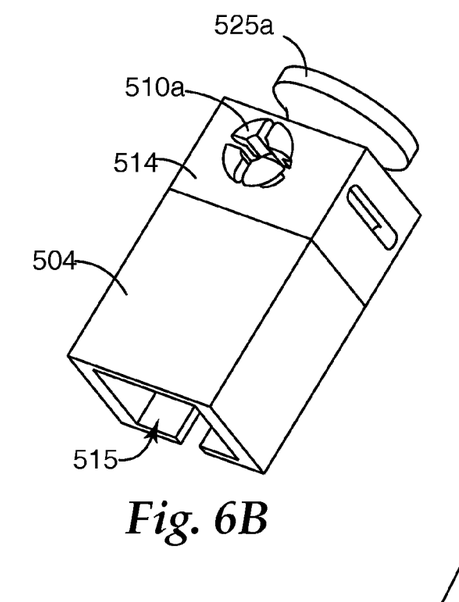
FIGS. 6B and 6C show isometric views of the individual housings of the coupling of FIG. 6A.
Figure 6C:
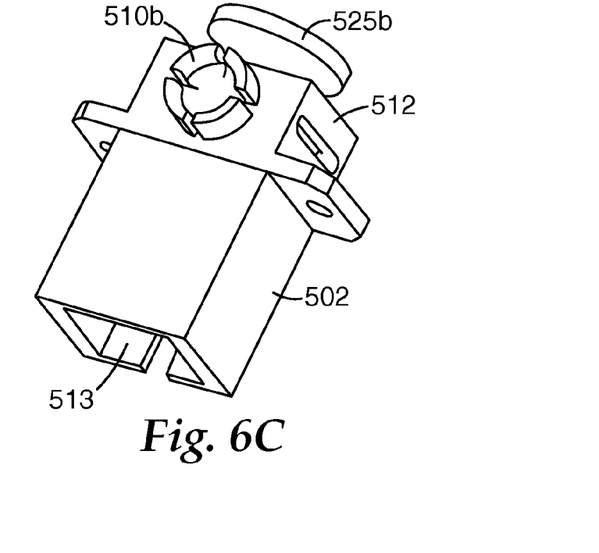

According to another exemplary embodiment, a flexible coupling 500 is shown in FIGS. 6A-6C. This coupling 500 is similar to the couplings described above, except that it includes an adjustable coupling mechanism 510 (see FIGS. 6B and 6C) to connect the housings 502 and 504 to one another. In a preferred aspect, the adjustable coupling mechanism 510 comprises a snap structure construction having a first snap element 510a (FIG. 6B) configured to be received in a second snap element 510b (FIG. 6C). For example, first snap element 510a can be formed on an outer surface of barrel housing 514 (it could also be formed on an outer surface of connector housing 504) and second snap element 510b can be formed on an outer surface of barrel housing 512 (it could also be formed on an outer surface of connector housing 502). The snap structure construction allows for rotation of one connector housing with respect to the other. In an alternative aspect, each housing can include a first coupling mechanism element formed on a first outer surface and a second coupling mechanism element formed on a second surface so that each housing can be readily coupled to another housing.

In particular, as shown in FIG. 6A, a coupling assembly, similar to coupling assembly 101 described above, having a small bend radius fiber 520, can be inserted in barrel housings 512, 514 that are coupled to connector housings 502, 504. Connector housing 502 includes a connector port 513 configured to receive conventional optical fiber connector 551 and housing 504 includes a connector port 515 configured to receive conventional optical fiber connector 552. Each barrel can further include funnel-shaped entrance ports or boots 525a, 525b. These funnel-shaped entrance ports or boots 525a, 525b can prevent over-bending of fiber 520 during rotation. Even after mounting of each optical fiber connector in its respective port, the coupling 500 can be rotated such that the entrance/exit angle is adjusted. The construction of coupling 500 can thus provide for an off-axis and off-plane coupling.

Figure 7A:
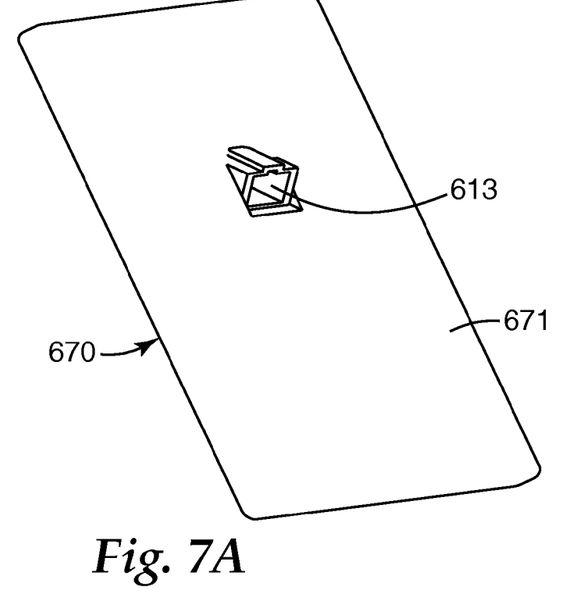
FIGS. 7A and 7B show front and back views of an exemplary coupling disposed in a wall plate according to another aspect of the invention.
Figure 7B:
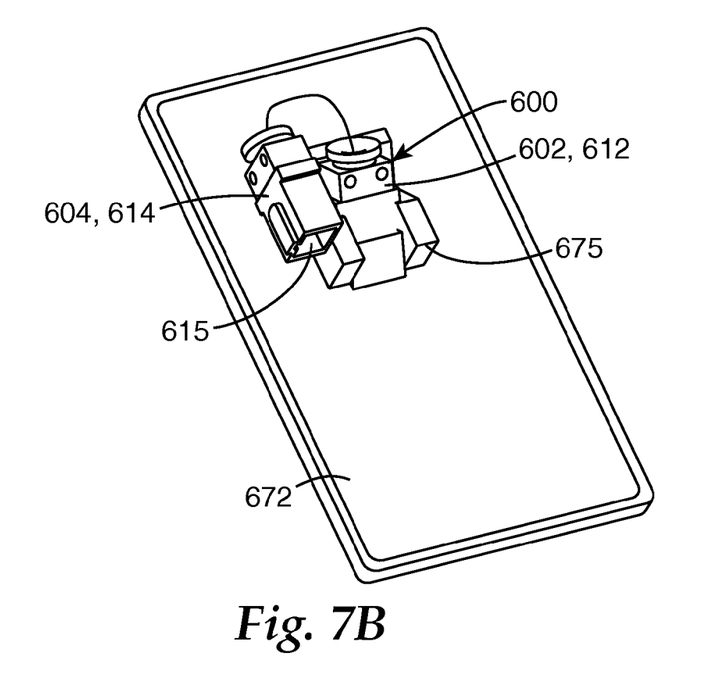

Based on the above constructions, the couplings herein can be used in a variety of restricted space applications. For example, another embodiment of the invention is shown in FIGS. 7A-7B, where a wall plate assembly 670 includes a coupling 600. In FIG. 7A, the front face 671 of the wall plate is shown, where the entrance port 613 of the coupling 600 is mounted at an angle as a socket for an incoming optical fiber connector. The angle can be selected to provide convenience or space-savings. In FIG. 7B, the rear face 672 of the wall plate is shown, where the remainder of barrel/connector housing 612, 602 is disposed in a wall-plate mounting structure 675. Barrel/connector housing 612, 602 houses a first ferrule that is coupled by small bend radius fiber 620 to a second ferrule housed in barrel/connector housing 614, 604. Barrel/connector housing 614, 604 is mounted to the rear wall of the wall plate and is oriented at a downward angle and off-axis with respect to a connector mounted to barrel/connector housing 612, 602. This configuration allows the required depth of the wall plate assembly 670 to be reduced.

Figure 8A:
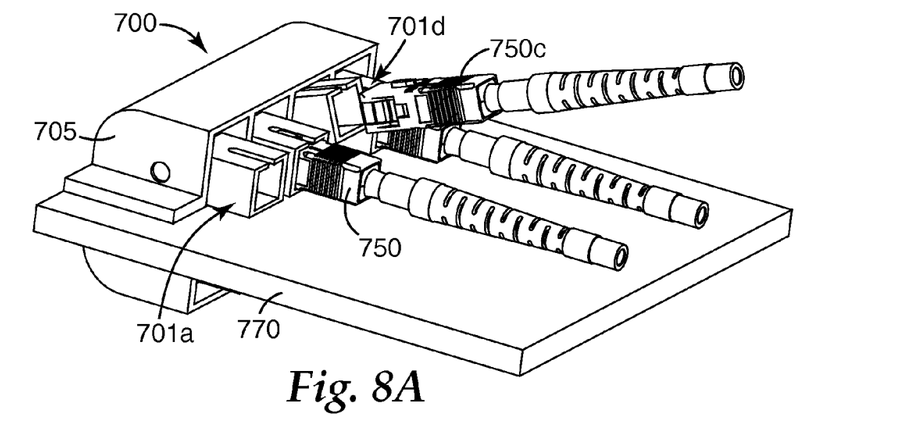
FIGS. 8A and 8B show isometric views of a multi-coupling device according to another aspect of the invention.
Figure 8B:
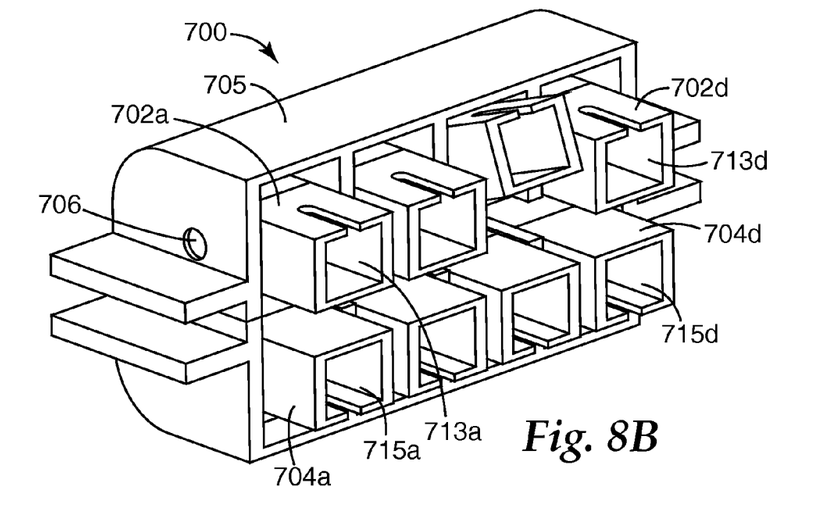
Figure 8C:
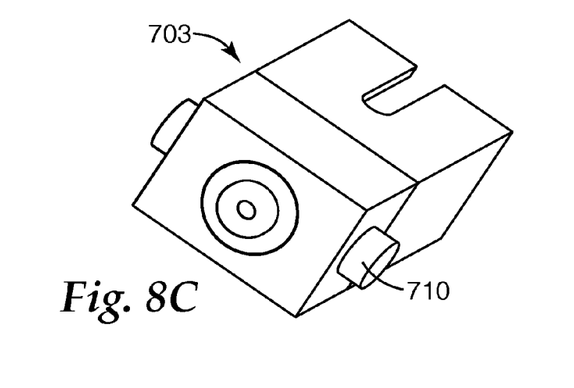
FIG. 8C shows an isometric view of a single coupling housing of the multi-coupling device of FIGS. 8A and 8B.

In a further exemplary aspect, FIGS. 8A and 8B show an exemplary multi-coupling device 700 according to another aspect of the invention. FIG. 8C shows an individual coupling housing 703 that can be utilized on multi-coupling device 700. In this aspect, a multi-coupling device 700 includes a plurality of adjustable couplings mounted on a support structure 705. In the exemplary aspect of FIGS. 8A and 8B, four separate couplings 701a-701d are provided. For example, coupling 701a can include a first housing 702a and a second housing 704a, each configured to receive an exemplary optical fiber connector (such as optical fiber connector 750). Similarly, coupling 701d can include a first housing 702d and a second housing 704d. Each coupling can include connector ports (see connector ports 713a/715a-713d/715d shown in FIG. 8B).

Each housing can be configured in a manner similar to the description above, and such as shown in FIG. 8C, to receive a coupling barrel and coupling fiber (not shown for simplicity). In addition, each housing can include an adjustable coupling mechanism, such as pins 710 (one of which is shown in FIG. 8C). Pins 710 can be inserted into corresponding receptacles formed in support structure 705, such as in holes 706 formed therein. This structure allows for some angular adjustment of each connector housing, such as for ease of insertion and removal of each optical fiber connector. For example, optical fiber connector 750c shown in FIG. 8A is oriented at a different angle than one or more of the other optical fiber connectors shown in the figure. In this aspect, it is more convenient to remove a single optical fiber connector from its closely spaced adjacent optical fiber connectors.

In the aspect of FIGS. 8A and 8B, multi-coupling device 700 can be configured for wall mounting or plate mounting (see e.g., exemplary plate 770). In this manner, at least a portion of the couplings can be hidden from view. In this manner, the multi-coupling device can be mounted in a cutout section of a panel, where each connector port on one side of the panel is connected to a connector port on the opposite side of the panel.

Thus, the above embodiments of the invention have applications in a wide variety of fiber networks and equipment. A first example includes fiber-to-the-home networks where service providers can make use the above couplings in fiber distribution panels, fiber closures, and wall outlets. A second example includes fiber distribution frames and patch panels disposed in wiring closets, data centers and central offices, where the above couplings can simplify fiber routing. The flexible optical fiber coupling can be used in a wide variety of housings/applications, including wall outlets, patch panels electronics enclosures and fiber distribution closures.

The flexible optical fiber coupling design can also provide for more compact configurations in other outside plant applications, such as pedestals, closures, terminals, and fiber NIDS, to name a few.

Various modifications, equivalent processes, as well as numerous structures to which the present invention may be applicable will be readily apparent to those of skill in the art to which the present invention is directed upon review of the present specification.

I claim:

1. An optical fiber coupling device, comprising:
   a coupling assembly that includes a first ferrule and a second ferrule and an optical fiber having a first end mounted in the first ferrule and a second end mounted in the second ferrule, wherein the first ferrule is disposed in an axial bore of a first barrel and the second ferrule is disposed in an axial bore of a second barrel, and wherein the coupling assembly is disposable in a coupling housing configured to receive at least two optical fiber connectors, wherein the coupling housing is configured to provide an adjustable coupling, wherein the coupling housing comprises a barrel housing and a connector housing, wherein the first and second barrels are mounted in the barrel housing and wherein the connector housing includes first and second ports to respectively receive a first optical fiber connector and a second optical fiber connector.

2. The optical fiber coupling device of claim 1, further comprising first and second ferrule alignment guides, wherein a first ferrule alignment guide is disposed within the barrel housing and provides passage for the first ferrule of the coupling assembly to contact a ferrule of the first optical fiber connector, and wherein a second ferrule alignment guide is disposed within the barrel housing and provides passage for the second ferrule of the coupling assembly to contact a ferrule of the second optical fiber connector.

3. The optical fiber coupling device of claim 1, wherein the coupling housing is configured to provide a 180 degree coupling.

4. The optical fiber coupling device of claim 1, wherein the coupling housing is configured to provide a 90 degree coupling.

5. A wall-plate assembly comprising the optical fiber coupling device of claim 1, a plate and a mounting structure to mount the coupling device to a first side of the plate, wherein at least one of the connector ports is disposed on a second side of the plate.

6. An optical fiber coupling device, comprising:
a coupling assembly that includes a first ferrule and a second ferrule and an optical fiber having a first end mounted in the first ferrule and a second end mounted in the second ferrule, wherein the first ferrule is disposed in an axial bore of a first barrel and the second ferrule is disposed in an axial bore of a second barrel, and wherein the coupling assembly is disposable in a coupling housing configured to receive at least two optical fiber connectors, wherein the coupling housing is configured to provide an adjustable coupling, wherein the coupling housing comprises a first barrel housing to house the first barrel, a second barrel housing to house the second barrel, a first connector housing including a first connector port to receive a first optical fiber connector, and a second connector housing including a second connector port to receive a second optical fiber connector, wherein the first barrel and connector housings are connected to the second barrel and connector housings via an adjustable coupling mechanism.

7. The optical fiber coupling device of claim 6, wherein the adjustable coupling mechanism comprises a first snap element disposed on one of the first barrel housing and the first connector housing and a second snap element engageable with the first snap element and disposed on one of the second barrel housing and the second connector housing.

8. An optical fiber coupling device, comprising:
a coupling assembly that includes a first ferrule and a second ferrule and an optical fiber having a first end mounted in the first ferrule and a second end mounted in the second ferrule, wherein the first ferrule is disposed in an axial bore of a first barrel and the second ferrule is disposed in an axial bore of a second barrel, and wherein the coupling assembly is disposable in a coupling housing configured to receive at least two optical fiber connectors, wherein the coupling housing is configured to provide an adjustable coupling, wherein the coupling housing is configured to provide an off-axis, off-plane coupling.

9. The optical fiber coupling device of claim 8, wherein the first and second barrels have a cylindrical shape.

10. The optical fiber coupling device of claim 8, wherein the first and second ferrules each have a length of from about 4 mm to about 7 mm and the optical fiber has a length of from about 20 mm to about 200 mm, and wherein the fiber has a minimum bend radius of less than about 15 mm.

11. The optical fiber coupling device of claim 8, wherein the coupling device is configured to receive at least two optical fiber connectors each having a connector format of one of an SC, LC, ST, and FC format.

12. A multi-port coupling device, comprising:
a first coupling assembly that includes a first ferrule and a second ferrule and an optical fiber having a first end mounted in the first ferrule and a second end mounted in the second ferrule, wherein the first coupling assembly is disposed in a first coupling housing configured to receive and couple at least two optical fiber connectors;
a second coupling assembly disposed in a second coupling housing configured to receive and couple at least two additional optical fiber connectors;
a support structure to mount the first and second coupling assemblies therein adjacent to one another; wherein the first and second coupling housings are each mounted to the support structure via an adjustable coupling mechanism.

13. The multi-port coupling device of claim 2, wherein the support structure is mounted in a cutout section of a panel, and wherein each coupling includes first and second connector ports, wherein a first connector port of the first coupling is disposed on one side of the panel and wherein the second connector port is disposed on the opposite side of the panel.

* * * * *

UNITED STATES PATENT AND TRADEMARK OFFICE
CERTIFICATE OF CORRECTION

PATENT NO.        : 8,444,326 B2
APPLICATION NO.   : 12/990796
DATED             : May 21, 2013
INVENTOR(S)       : James R Bylander Page 1 of 1

It is certified that error appears in the above-identified patent and that said Letters Patent is hereby corrected as shown below:

In the Claims:

Column 12,
Line 47, delete "claim 2" and insert in place thereof -- claim 12 --.

Signed and Sealed this
Seventeenth Day of September, 2013

Teresa Stanek Rea
*Deputy Director of the United States Patent and Trademark Office*